United States Patent
Sohlman et al.

[11] Patent Number: 6,097,774
[45] Date of Patent: Aug. 1, 2000

[54] ARRANGEMENT AND METHOD IN A BASE STATION

[75] Inventors: Ingemar Sohlman, Spånga; Tommy Stenvi, Uppsala, both of Sweden

[73] Assignee: Telefonaktiebolaget LM Ericsson, Stockholm, Sweden

[21] Appl. No.: 08/981,406

[22] PCT Filed: May 30, 1996

[86] PCT No.: PCT/SE96/00694

§ 371 Date: Dec. 11, 1997

§ 102(e) Date: Dec. 11, 1997

[87] PCT Pub. No.: WO96/42143

PCT Pub. Date: Dec. 27, 1996

[30] Foreign Application Priority Data

Jun. 12, 1995 [SE] Sweden .................................. 9502161

[51] Int. Cl.[7] .............................. H04L 1/02; H04B 7/10; H03H 7/30
[52] U.S. Cl. ............................................ 375/347; 375/231
[58] Field of Search .................................. 375/267, 347, 375/231, 343; 455/133–135

[56] References Cited

U.S. PATENT DOCUMENTS

| | | | |
|---|---|---|---|
| 4,343,759 | 8/1982 | Kustka et al. | 375/14 |
| 5,091,918 | 2/1992 | Wales | 375/11 |
| 5,121,391 | 6/1992 | Paneth et al. | 455/562 |
| 5,131,006 | 7/1992 | Kamerman et al. | 375/142 |
| 5,131,007 | 7/1992 | Brown et al. | 375/267 |
| 5,226,060 | 7/1993 | Goodson et al. | 375/14 |
| 5,235,621 | 8/1993 | Amir-Alikhani | 375/100 |
| 5,297,169 | 3/1994 | Backström et al. | 375/13 |

FOREIGN PATENT DOCUMENTS

| | | |
|---|---|---|
| 430481 | 6/1991 | European Pat. Off. . |
| 457448 | 11/1991 | European Pat. Off. . |
| 457460 | 11/1991 | European Pat. Off. . |
| 615352 | 9/1994 | European Pat. Off. . |

Primary Examiner—Tesfaldet Bocure
Attorney, Agent, or Firm—Burns, Doane, Swecker & Mathis, L.L.P.

[57] ABSTRACT

The present invention relates to an arrangement and a process for the demodulation of a received signal to a form suitable for decoding. A first element (4) is adapted to correlate at least one first signal with a predetermined training sequence for a first type of signal routine and to make at least one first qualitative measurement of the first signal. A second element (5) is adapted to process the second signal according to a second type of signal routine by correlating the second signal with a predetermined training sequence for a second type of signal routine, thereby making a first qualitative measurement of the second signal. The qualitative measurements of the said first and second signal are compared in a first means (6), which is adapted to select at least one signal for which the best value is obtained in the said qualitative measurement and to establish the type of signal routine corresponding to the best qualitative measurement. The arrangement finally comprises a demodulator (7) for the demodulation of at least one selected signal according to the established type of signal routine.

10 Claims, 1 Drawing Sheet

ARRANGEMENT AND METHOD IN A BASE STATION

TECHNICAL SCOPE

The present invention relates to an arrangement and a process in a base station for the demodulation of a received signal to a form suitable for decoding in a decoder.

PRIOR ART

In the spheres of radio communications and telecommunications, inter alia, signals are transmitted via channels with interference of unknown type. In an attempt to reduce this type of interference, so-called equalisers are used, which are operable to reproduce the undisturbed signal. The said equalisers are based on the principle of estimating the transmission function for the disturbed channel. This is usually done by making an estimate of the pulse response of the transmission medium. A known sequence, a so-called training sequence, which is usually transmitted in the middle of each time interval, is fed to the equalizer. The equalizer receives the said sequence and, with knowledge of the bit sequence which this represents, a transmission function can be estimated for the signal received. An inverted filter is then constructed through which the received signal can pass so that any interference, which has been introduced into the signal in the course of transmission, is reduced.

Since a mobile station in a mobile radio system moves, the interference on the allotted channel between a first base station and the mobile station ultimately becomes so great that it is no longer worthwhile trying to compensate for this interference with an equaliser in the base station. Instead the communication to the mobile station must pass by way of a second base station with better transmission conditions by performing a so-called handover between the first and second base stations.

In the GSM system, for example, so-called synchronous handover is used between base stations. A problem with this type of handover is that a signal received in the base station may consist both of a burst routine and a standard signal routine. When a mobile station has received a message that handover to a new base station is to be performed, the mobile station sends a predetermined number of burst routines corresponding to the number of successive TDMA frames on a new channel which is notified from the base station. In the GSM system four such burst routines are sent. After emitting the said burst routines, the mobile station proceeds to send normal signal routines via the designated channel. The receiving base station and an equaliser situated therein thus receive signal routines of two different types in connection with the handover. The said signal routines comprise training sequences of differing length.

A mobile telephone system receiver is already known from EP 0 457 448. The receiver comprises two receiver antennas which are connected by way of a first and a second channel to receiver circuits which each contain an equaliser. The two equalisers are separate from one another and correlation processes are performed therein independently of one another, which makes it possible to process different signals. After equalisation the signal which gives the best result is selected. The said signal is relayed for further processing. The known receiver, however, is not intended for a situation in which two different signal routines are received in connection with handover and does not provide a good solution to this problem. Another disadvantage with the known receiver is that the required signal processing capacity for the equalisers is high, since the latter function independently of one another.

DESCRIPTION OF THE INVENTION

The present invention is intended to solve this problem by providing an arrangement in a base station for the demodulation of a received signal to a form suitable for decoding, where the received signal may consist of both a burst routine and a standard signal routine. The invention is especially suited to use in a base station in a system with synchronous handover between base stations.

This problem is solved by the arrangement according to the invention which consists of a specially designed equaliser which is adapted to identify the type of signal routine in a received signal and to perform demodulation of the said sill as a function of the type of signal routine.

The arrangement according to the invention comprises a first element for correlating at least one first signal with a predetermined training sequence for a first type of signal routine and to make at least one first qualitative measurement of the first signal. The arrangement further comprises a second element, which is adapted to process at least one second signal in accordance with a second type of signal routine by correlating the second signal with a predetermined training sequence for a second type of signal routine, thereby making a first qualitative measurement of the second signal. In order to establish the type of signal routine corresponding to that of the signal received, the arrangement comprises a first means of comparing the qualitative measurements of at least one first and one second signal. The said means are adapted to select at least one signal for which the best value of is obtained in the said qualitative measurement and to establish the type of signal routine corresponding to the best qualitative measurement. The arrangement finally comprises a demodulator for the demodulation of at least one selected signal according to the type of signal routine identified.

The invention also relates to a process in a base station for the demodulation of a received signal to a form suitable for decoding. In the process according to the invention at least one first signal is correlated with a predetermined training sequence for a first type of signal routine and at least one first qualitative measurement of the first signal is made. Similarly at least one second signal is correlated with a predetermined training sequence for a second type of signal routine and at least one first qualitative measurement is made of the second signal. The said first qualitative measurement is compared for at least one first and one second signal and at least one signal having the best value for the said qualitative measurement is selected. The type of signal routine which corresponds to the said best qualitative measurement is also identified in this evaluation. According to the type of signal routine identified that signal corresponding to the said best first qualitative measurement is then demodulated.

The present invention also relates to an arrangement and a process in a base station, use being made of the diversity to modulate a received signal to a form suitable for decoding. The arrangement according to the invention comprises a first element for correlating at least one first signal with a predetermined training sequence for a first type of signal routine and making at least one first qualitative measurement of the first signal. The arrangement further comprises a second element, which is adapted to process a second signal according to a second type of signal routine by correlating the second signal with a predetermined training sequence for a second type of signal routine, thereby making a first qualitative measurement of the second signal. In order to establish the type of signal routine corresponding to that of the signal received, the arrangement comprises a first means for compare the qualitative measurements of at least one first and one second signal. The said means is adapted to select at least one signal for which the best value is obtained in the said qualitative measurement and to establish the type of signal routine corresponding to the best qualitative measurement. The arrangement further comprises a third element for repeating the correlation for the signal which is not selected in the said comparison with the training sequence for the established type of signal routine. In this correlation a third qualitative measurement is obtained for this signal. A demodulator connected to the said third element and said first means receives the first and the second signal, information on the type of signal routine and information on the qualitative measurements from the correlation of the first and the second signal respectively with a training sequence for the best type of signal routine selected. The demodulator is adapted to demodulate at least one selected signal according to the above-mentioned information.

A significant advantage with the arrangements and process for equalisation described above is that the signal processing capacity does not need to be significantly increased despite the fact that processing of two different types of signal can be performed in the equaliser, with or without spatial diversity.

PREFERRED EMBODIMENTS

The invention will be explained below with reference to FIG. 1 and FIG. 2 which show two preferred embodiments of the equaliser according to the invention.

Figure 1:
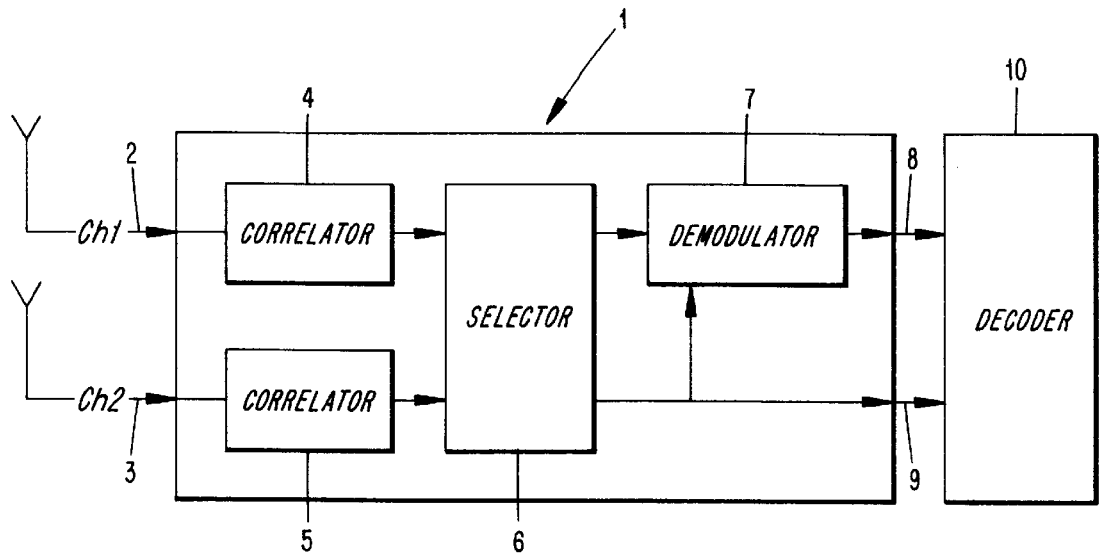
FIG. 1 shows a first embodiment of an equaliser according to the invention.

FIG. 1 shows an equaliser according to the invention. The equaliser 1 is adapted to receive signals on two channels Ch1, Ch2 via two different inputs 2, 3. The signals received may, for example, originate from two different antennas in the base station of which the equaliser 1 forms part. A case in which spatial diversity is utilised in order to obtain improved reception is described later with reference to FIG. 2. The equaliser 1 according to the invention can obviously also occur in base stations in which spatial diversity is not employed. In this case the same signal is fed to both inputs 2, 3 of the equaliser.

The equaliser 1 performs correlation between a received signal and a predetermined training sequence. In a first element 4 in the equaliser a signal from the first input 2 is correlated with a training sequence for a first type of signal routine, for example a training sequence for a burst routine. Similarly, in a second element 5 in the equaliser 1, a signal from the second input 3 is correlated with a training sequence for a second type of signal routine. The second type of signal routine differs from the first and consists, for example, of a standard signal routine. The equaliser 1 according to the invention therefore makes it possible to process a signal on a first input 2 such as a burst routine and a signal on a second input 3 such as a standard signal routine.

In connection with the correlation of each of the signals, the signal quality, access delay and any other qualitative measurement which may be of interest for each signal are established in the said first and second element 4, 5 respectively, in order to be able to assess how a received signal relates to the originally transmitted, undisturbed signal. The equaliser 1 also comprises a first means 6 in which the best type of signal routine can be selected according to the correlation in the said first or second element 4, 5 respectively, in order to evaluate the said qualitative measurement. The signal which relates best on the basis of a comparison of the said qualitative measurement is selected in the said first means 6 and relayed to a demodulator 7. The selection is based on a combination of the choice of signal and type of signal routine, since the selection is founded on the products of correlation between two signals and two sequences of different signal routine type.

A signal which is correlated with a training sequence for the wrong type of signal routine will, however, not be interpreted as the best signal and therefore that signal which is correlated with a predetermined training sequence for a type of signal routine corresponding to the signal's routine type will be selected. The criterion for selection in the said first means 6 for selection of the best type of signal routine comprises a parameter relating to the signal quality and another parameter relating to access delay, but other parameters can obviously also be used in this selection. The criterion may consist of conditional statements in which the said parameters are compared with predetermined constants.

The said demodulator 7 is adapted to demodulate the selected signal. The demodulation is performed as in previously known equalisers, the only difference is that the demodulator 7 receives information regarding the type of routine selected in order to adjust the demodulation thereto. Information regarding the selected type of signal routine is also available on an output 9 from the equaliser 1, which means that this information can be used in a decoder 10 situated outside the equaliser. The decoder 10 receives the demodulated signal and decodes this according to the type of signal routine selected in the equaliser 1.

In order to further improve the demodulation spatial diversity may be utilised. Further signal processing stages should then be introduced into the arrangement according to the invention. An equaliser 11 according to such an embodiment is shown in FIG. 2. In this embodiment the equaliser 11 receives signals via two separate inputs 12, 13, which are connected to two separate antenna in a base station. The processing in the equaliser 11 corresponds to that described in connection with FIG. 1 up to and including the selection of the best type of signal routine. In a first element 14 in the equaliser a signal from the first input 12 is correlated with a training sequence for a first type of signal routine, for example a training sequence for a burst routine. In the same way, in a second element 15 in the equaliser 11, a signal from the second input 13 is correlated with a training sequence for a second type of signal routine. The second type of signal routine differs from the first and consists, for example, of a standard signal routine.

In connection with the correlation of each of the signals, a first qualitative measurement of each signal is established in the said first and second element 14. 15 respectively, in order to be able to assess how a received signal relates to the originally transmitted, undisturbed signal. The equaliser 11 comprises a first means 16 in which selection of the best type of signal routine can be undertaken according to the correlation in the said first and second element 14, 15 respectively, in order to evaluate the said first qualitative measurement.

The signal and type of signal routine which relate best in a comparison of the said first qualitative measurement are selected in the said first means 16.

When the best type of signal routine as been established, the diversity of the incoming signals is utilised in order, if possible, to improve the result in the demodulation. A new correlation is performed for that of the two signals which has not been correlated with the training sequence for the selected type of signal routine. In a third element 17 the said signal is correlated with the training sequence for the selected type of signal routine, for example the training sequence for a burst routine. In connection with this correlation a second, new qualitative measurement of the signal is established, which second qualitative measurement includes similar information to the first qualitative measurement, that is it gives an idea of the interference to which the signal is exposed in transmission to the equaliser. The qualitative measurement may, for example, include access delay and the signal quality.

A demodulator 18 receives the signals and information regarding the transmission quality, that is the said qualitative measurement. The demodulator uses the spatial diversity in the received signals when opting, at bit level, to demodulate the signal or channel Ch1, Ch2 which from a comparison gives the best qualitative measurement.

Information regarding the selected type of signal routine is made available on the first output 19 from the equaliser, which means that this information can also be used in a decoder 21 situated outside the equaliser 11. The said decoder 21 also receives the modulated signal from the equalisers second output 20 and decodes this according to type of signal routine selected in the equaliser 11.

Figure 2:
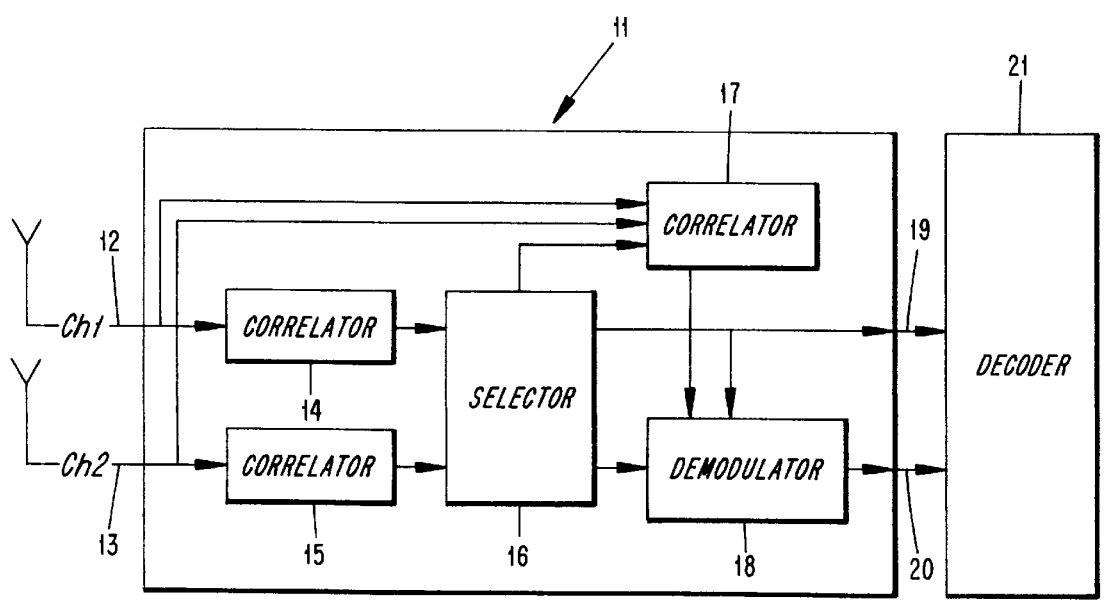
FIG. 2 shows a second embodiment of an equaliser according to the invention.

The construction of the equalisers according to the invention shown in FIG. 1 and FIG. 2 can also be used in an equaliser which is adapted to receive N+M channels via two separate inputs 2, 12; 3, 13. N of the said channels are received via a first input 2, 12 and the remaining channels M via a second input 3, 13 to the equaliser 1, 11. Correlation between the signals on the various channels and two predetermined training sequences is performed in the same way as in the embodiments described earlier.

What is claimed is:

1. An arrangement in a base station for the demodulation of a received signal to a form suitable for decoding, comprising:
    a first element for correlating at least one first signal with a first predetermined training sequence for a first type of signal burst and making at least one first quality measurement of the first signal;
    a second element for correlating at least one second signal with a second predetermined training sequence for a second type of signal burst and making at least one first quality measurement of the second signal;
    a first means for comparing the quality measurements of said at least one first and one second signal, which means is adapted to select at least one signal having a best quality measurement, and for establishing the type of signal burst which gives the best value in the quality measurement; and
    a demodulator for the demodulation of at least one selected signal according to the established type of signal burst.

2. An arrangement according to claim 1, further comprising a first input and a second input respectively, which are connected to a first and a second antenna respectively in a base station and through which the first and second signals respectively are fed to the arrangement on a first channel and a second channel respectively.

3. An arrangement according to claim 1, further comprising a first output and a second output respectively, by means of which the demodulated signal and the established type of signal burst are respectively outputted to a decoder.

4. An arrangement according to claim 2, wherein:
    the first input is adapted to receive signals on N channels;
    the first element is separately adapted to process the said signals on N channels as a first signal type;
    the second input is adapted to receive signals on M channels; and
    the second element is separately adapted to process the said signals on M channels as a second signal type.

5. An arrangement in a base station for the demodulation of a received signal to a form suitable for decoding, comprising:
    a first element for correlating at least one first signal with a first predetermined training sequence for a first type of signal burst and making at least one first quality measurement of the first signal;
    a second element for correlating at least one second signal with a second predetermined training sequence for a second type of signal burst and making at least one first quality measurement of the second signal;
    a first means for comparing said first quality measurement of said at least one first and one second signal, which means is adapted to select at least one signal which has a best first quality and for establishing the type of signal burst which gives the best value first quality;
    a third element for correlating at least one signal not selected in said first means with the training sequence corresponding to the type of signal burst selected in said first means and for making at least one second quality measurement of this signal;
    a demodulator which is adapted to compare the first and second quality measurements and to demodulate at least one signal having the best value based on the comparison.

6. An arrangement according to claim 5, further comprising a first input and a second input respectively, which are connected to a first and a second antenna respectively in the base station and through which the first and second signals respectively are fed to the arrangement on a first channel and a second channel respectively.

7. An arrangement according to claim 5, further comprising a first output and a second output respectively, by means of which the established type of signal burst and demodulated signal are respectively outputted to a decoder.

8. An arrangement according to claim 6, wherein:
    the first input is adapted to receive signals on N channels;
    the said first element is adapted to separately process said signals on N channels as a first signal type;
    the second input is adapted to receive signals on M channels; and
    the said second element is adapted to separately process said signals on M channels as a second signal type.

9. A method for the demodulation of a received signal to a form suitable for decoding, comprising the following stages:
    correlation of at least one first signal with a first predetermined training sequence for a first type of signal burst and making at least one first quality measurement of the first signal;
    correlation of at least one second signal with a second predetermined training sequence for a second type of signal burst and making at least one first quality measurement of the second signal;
    comparison of the quality measurements for said at least one first and one second signal, selection of at least one signal having the best value in the quality measurement and establishment of the type of signal burst giving the best value in the quality measurement; and demodulation of at least one selected signal according to the established type of signal burst.

10. A method for the demodulation of a received signal to a form suitable for decoding, comprising the following stages:

correlation of at least one first signal with a first predetermined training sequence for a first type of signal burst and making at least one first quality measurement of the first signal;

correlation of at least one second signal with a second predetermined training sequence for a second type of signal burst and making at least one first quality measurement of the second signal;

comparison of the quality measurements for said at least one first and one second signal, selection of at least one signal having the best value in the quality measurement and establishing of the type of signal burst giving the best value in the quality measurement;

correlation of at least one signal not selected with the one of the first and second predetermined training sequences corresponding to the selected type of signal burst and making at least one second quality measurement for this signal; and comparison of the first and second quality measurements adjusted to the selected type of signal burst and demodulation of at least one signal having the best value in the quality measurement.

* * * * *